March 14, 1967     D. EPSTEIN ET AL     3,309,651

UNDERWATER SIGNALLING SYSTEMS

Filed Nov. 13, 1964

United States Patent Office 3,309,651
Patented Mar. 14, 1967

3,309,651
UNDERWATER SIGNALLING SYSTEMS
David Epstein and Sidney Epstein, Brooklyn, N.Y., assignors to Vadys Associates, Ltd., Brooklyn, N.Y., a corporation of New York
Filed Nov. 13, 1964, Ser. No. 412,284
2 Claims. (Cl. 340—4)

This invention relates to apparatus and methods for communicating with underwater vehicles and more particularly with the secure communication of a submerged vehicle with a surface vessel or aircraft.

The problem of communication with fully submerged vehicles is a difficult one. This is due to the fact that the natural communication link in air is electromagnetic waves, which (except for very low frequencies) are severely attenuated in water. Conversely, sound waves seem to be most effective for conveying information beneath the surface of the sea. Thus, for effective communication between an aircraft and a submarine for example, an interface matching device such as a sonobuoy is required at the air/water boundary. The sonobuoy maintains radio contact with the aircraft and sonic contact with the submarine; however, this system has many drawbacks, viz: (1) limited range, particularly at the sonic end, (2) susceptible to hostile jamming both in the air and water, (3) non-secure, in either the air or water milieu, (4) uneconomical, each communication contact requires the expenditure of a sonobuoy, (5) dangerous, unless burdensome precautions are taken, physical presence of sonobuoy betrays a past or present rendezvous, (6) awkward, a supply of sonobuoys must be carried and maintained, sonobuoy must be launched before any contact can be made.

Briefly, a novel, secure communication system and apparatus to enable a submerged vehicle to communicate with a surface vessel or an aircraft is proposed and described. The system obviates the need for sonobuoys. Transmission of information takes place as a two stage process: convection, then radiation. Heat energy is transferred from the submerged craft to the ambient water; vertical convection currents convey the information bearing "hot water" to the surface. The surface vessel or aircraft then detects the infrared radiation by means of techniques well known to practitioners of the art; the difference in temperature between the modulated, heated water and the colder background is detected and contact with the submerged vehicle is thereby established. Two-way secure communication obtains if the system and apparatus described in our copending application, "Underwater Communication and Control," Ser. No. 344,491, filed Feb. 12, 1964, is used in conjunction with this invention to provide a signalling capability from (or above) the surface to the submerged vehicle.

It is an object of this invention to provide a unique method for secure communication from a submarine vessel to a surface vessel or aircraft.

It is another object of this invention to provide novel apparatus to enable a submerged vehicle (stationary or in motion) to communicate with a surface vessel or aircraft.

Still another object of this invention is to provide, in conjunction with copending application cited above, a unique method and novel apparatus for two-way communication between a submerged vessel and a surface vessel or aircraft.

A feature of the invention is the use of convection currents to convey the information from the submerged vehicle to the surface.

Another feature of the invention is the use of infrared (IR) radiation to convey the information from the surface to the receiver.

Other objects, features, and advantages of the subject invention will be apparent from the following specification and claims and from the accompanying drawings which illustrate the principles of the invention as incorporated in the presently preferred embodiments thereof.

Referring to the drawings wherein similar reference characters indicate like elements throughout:

Figure 1:
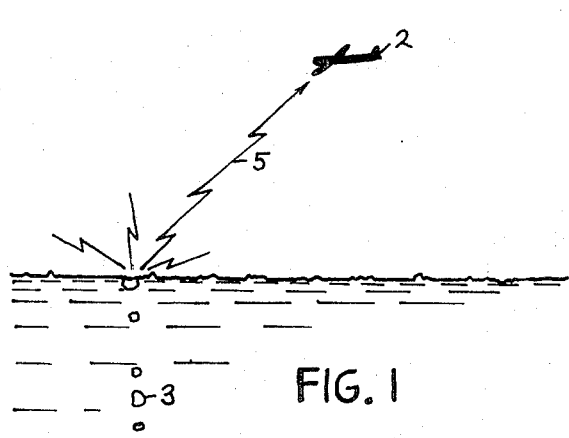
FIG. 1 is an elevation view showing the flow of information from a submerged vehicle to an aircraft.

FIG. 1 shows an aircraft 2 which is to receive one-way communication from a submerged vehicle 4. Water drawn from the immediate vicinity of 4 is heated in accordance with a digital code. In its simplest sense, the water can be heated by a hot plate, but a configuration which would allow more rapid and efficient heating of "gobs" of water is preferred. Such an apparatus is heater unit 6 shown in FIG. 2. Heater 6 is ordinarily set in a vertical position so as to permit a convection current to flow, i.e., as the hot water rises up out of the top, by virtue of its natural buoyancy alone or assisted by means of forced convection, cool water moves in through the bottom. The heater unit 6 ordinarily consists of an inner, hollow, metal tube 8 which acts as the heating chamber. Electrical heating elements 10, electrically insulated by a tube of insulation 9, surround the thin-walled metallic water heater tube 8. The outer surface of heating element 10 is encased by an electrical and thermal insulating jacket 12. To obtain a greater heating surface to water volume ratio, a multiplicity of smaller diameter heating units, suitably arranged in a parallel bank, may be used in lieu of one large diameter unit.

To transmit a message, say in Morse code, water heater unit 6 must be keyed or switched on and off in accordance with the constraints of the system, the requirements of the code, and the dictates of the message. In practice, the keying is done in two stages. The key 14 is used to pulse modulate the electrical energy at the low power level. Each time the key 14 is depressed, the high power modulator unit 16 gates electrical energy, from the power supply unit 18, into the heater unit 6 until such time as the key is released.

A message is sent by operating the transmitting key 14 in the customary manner, albeit at a slower rate because of the "low pass" filter characteristics of the water medium due to thermal dispersion. The message consists of a train of heated pulses of hot water 3; the train of pulses 3 rise serially to the surface as a discontinuous convection current as shown in FIG. 1. When a pulse of hot water reaches the water/air interface, the local surface temperature rises at that point and at that time. This information is transmitted, omnidirectionally, through the air medium as a local increase in IR radiation 5. It is stated by R. Peloquin and M. Weiss in "Airborne Instrument for Precision Measurement of Sea Surface Temperature using Infrared Radiation Emited by the Sea," Marine Sciences Instrumentation, vol. 2, pages 61–72, R. D. Gaul, Editor, Plenum Press, New York, 1963, that it is possible to detect, from an aircraft at a distance, temperature differentials in the order of $1 \times 10^{-1}$ degree C. at the surface of the water.

Figure 3:
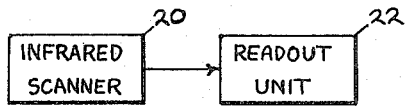
FIG. 3 is a block diagram of the receiver unit.

Referring to FIG. 3, the aircraft 2 carries an IR scanner 20 having, preferably, search and tracking capabilities. Representative IR scanners are described by M. R. Holter and W. L. Wolfe in "Optical-Mechanical Scanning Techniques," Proc. IRE, page 1546, vol. 47 (1959), and R. H. McFee, "Infrared Search System Design," proc. IRE, page 1550, vol. 47 (1959). The output of the scanner 20 is fed to the readout unit 22, containing, preferably, a cathode ray tube. The IR source (message) is acquired, tracked, decoded, and recorded manually or automatically or in combination thereof.

*Modes of operation*

Figure 2:
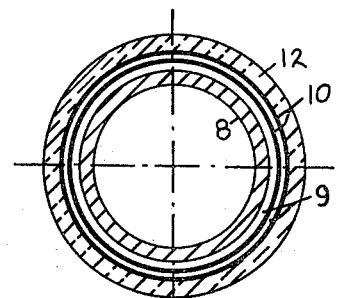
FIG. 2 is a block diagram of a single channel transmitter unit and contains a cross-sectional view of the heater unit.
Figure 2:
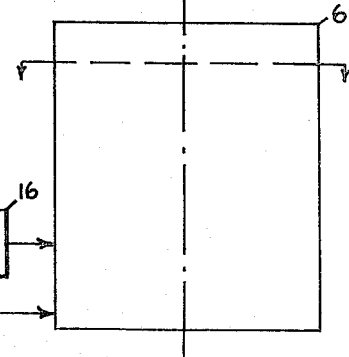

(A) Stationary submerged vehicle: (1) Single channel system: The presently preferred embodiment of the single channel transmitter unit is shown in FIG. 2. A submerged vehicle 4 utilizing a single heater unit 6 would signal, say, by means of the Morse code. Each character is formed by a serial sequence of "hot water" pulses, with time durations of said pulses corresponding to the dots and dashes characteristic of said digital code; alphanumeric characters, made up of dots and dashes, and words, made up of characters, likewise follow serially. The signalling rate is a function of vertical depth, dispersion of heat from water pulse, rate of ascent of convection curent, etc.

Figure 4:
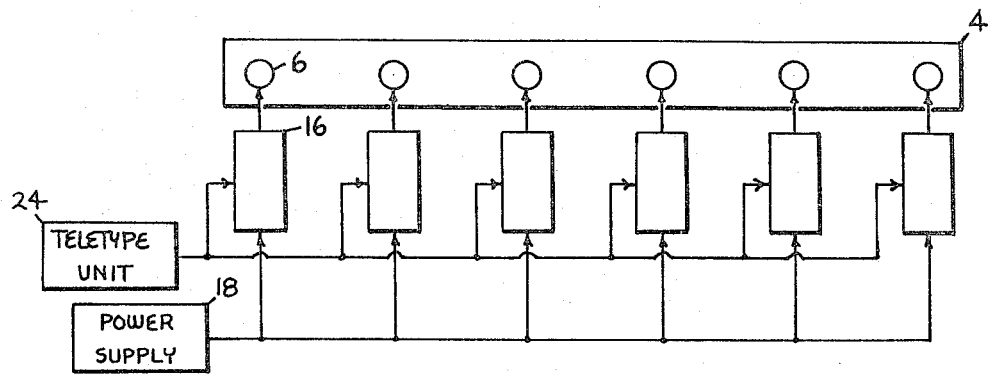
FIG. 4 is a block diagram of a multiple channel transmitter unit.

(2) Multiple channel system: The signalling rate may be increased by using parallel channels and pulse code modulation by means of a multiple heater transmitter unit such as the one shown on FIG. 4; i.e., wherein all "bits" of a character are formed simultaneously. A "bit" suitably consisting of a pulse or the absence of a pulse and with all pulses having the same time duration. To transmit a character, e.g., from an alphabet of 64 characters, a parallel digital code of at least six bits/character is required, one heater 6 per bit. The heaters 6 are preferably spaced equidistant along the center line of the hull of 4. By utilizing the entire length of the hull (approximately 300 feet), crosstalk amongst the parallel bits of a character is minimized. Each character is generated in parallel, from teletypewriting unit 24 say, and the characters follow one another serially.

(B) Moving submerged vehicle: This mode is sensibly the same as the ones described above, but gives a better signal to noise ratio than the "stationary" modes because the "writing" is done on "virgin" water surface.

It should be understood that the foregoing disclosure relates only to preferred embodiments of the invention and that numerous modifications and variations may be made therein without departing from the spirit and scope of the invention as set forth in the appended claims.

What we claim is:

1. Apparatus for signalling by coded messages from an underwater vehicle to a surface vessel or aircraft comprising:
   means on said vehicle for coding messages,
   a thermal energy source,
   modulator means coupled to said means for coding and to said source,
   said source being disposed in the water to thereby impart thermal energy thereto representative of the coded messages,
   said energy being conveyed to the water surface by convection to thereby produce local temperature differentials at the water surface,
   means above said surface for detecting said temperature differentials,
   and means coupled to said detecting means for decoding and reading out said messages.

2. Apparatus for signalling by coded messages representative of predetermined intelligence from an underwater vehicle to a surface vessel or aircraft comprising:
   thermal energy source means on said underwater vehicle for emitting discrete pulses of water of higher thermal energy than that of the surrounding water representative of the coded messages,
   said thermal energy of said pulses being conveyed to the water surface by convection to thereby produce local temperature differentials at the water surface,
   means disposed above said water surface for detecting said temperature differentials
   and means coupled to said detecting means for reading out said messages.

References Cited by the Examiner

UNITED STATES PATENTS

| | | | |
|---|---|---|---|
| 2,412,165 | 12/1946 | McDermott | 250—83.3 |
| 3,153,147 | 10/1964 | Bradley et al. | 250—83.3 |
| 3,227,882 | 1/1966 | Bissett et al. | 250—83.3 X |

RODNEY D. BENNETT, *Acting Primary Examiner.*

CHESTER L. JUSTUS, *Examiner.*

R. A. FARLEY, *Assistant Examiner.*